US 11,182,194 B2

(12) United States Patent
Kaefer et al.

(10) Patent No.: US 11,182,194 B2
(45) Date of Patent: Nov. 23, 2021

(54) METHOD FOR OPERATING AN AUTOMATION SYSTEM AND AUTOMATION SYSTEM OPERATING ACCORDING TO THE METHOD

(71) Applicant: SIEMENS AKTIENGESELLSCHAFT, Munich (DE)

(72) Inventors: Gerald Kaefer, Huntington Beach, CA (US); Benjamin Kohler, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/613,629

(22) PCT Filed: Feb. 16, 2018

(86) PCT No.: PCT/EP2018/053898
§ 371 (c)(1),
(2) Date: Jan. 14, 2020

(87) PCT Pub. No.: WO2018/166750
PCT Pub. Date: Sep. 20, 2018

(65) Prior Publication Data
US 2020/0379795 A1 Dec. 3, 2020

(30) Foreign Application Priority Data
Mar. 15, 2017 (EP) .................................... 17161107

(51) Int. Cl.
G06F 9/455 (2018.01)
G06F 8/61 (2018.01)
(Continued)

(52) U.S. Cl.
CPC ............ *G06F 9/45558* (2013.01); *G06F 8/61* (2013.01); *G06F 9/4411* (2013.01); *G06F 11/34* (2013.01);
(Continued)

(58) Field of Classification Search
None
See application file for complete search history.

(56) References Cited

U.S. PATENT DOCUMENTS 10,095,537 B1 * 10/2018 Neogy ................. G06F 9/45558
10,540,192 B1 * 1/2020 Isdal ................... G06F 9/45504
(Continued)

FOREIGN PATENT DOCUMENTS

EP 1515229 A2 3/2005

OTHER PUBLICATIONS

Duncan Hardie: "How to Get Started Creating Oracle Solaris Kernel Zones in Oracle Solaris 11", XP055403985. Published Jul. 2014. pp. 1-6. URL:http://www.oracle.com/technetwork/articles/servers-storage-admin/howto-create-kernal-zones-sll-2251331 html#6.
(Continued)

Primary Examiner — Wynuel S Aquino
(74) Attorney, Agent, or Firm — Lempia Summerfield Katz LLC

(57) ABSTRACT

The disclosure relates to a method for operating an automation system and automation system operating according to the method, wherein an application to be executed on the automation system is available in an encapsulated form in a container. In the event that the application encapsulated in the container requires kernel mode software, a host extender executed on the automation system uses metadata included in the container to load the required kernel mode software from a database having kernel mode software and install the software locally on the automation system. In the event of an
(Continued)

identified incompatibility on the automation system, the host extender installs a virtual machine, loads the container, which led to the incompatibility, onto the virtual machine and loads the kernel mode software required by the application contained by the container into the kernel of the virtual machine.

11 Claims, 4 Drawing Sheets

(51) Int. Cl.
    *G06F 9/4401* (2018.01)
    *G06F 11/34* (2006.01)

(52) U.S. Cl.
    CPC ............ *G06F 2009/4557* (2013.01); *G06F 2009/45562* (2013.01)

(56) References Cited

U.S. PATENT DOCUMENTS

| | | | | |
|---|---|---|---|---|
| 2009/0241109 A1* | 9/2009 | Vandegrift | .......... | G06F 9/45533 718/1 |
| 2013/0311613 A1* | 11/2013 | Aleksandrov | .......... | H04L 67/02 709/219 |
| 2015/0200920 A1* | 7/2015 | Norton | ............... | H04L 63/0471 713/153 |
| 2016/0274928 A1* | 9/2016 | Linton | ............... | G06F 9/45558 |
| 2017/0075675 A1* | 3/2017 | Babol | ..................... | G06F 8/64 |
| 2017/0206073 A1* | 7/2017 | Kirkpatrick | ............. | H04L 67/34 |
| 2018/0039524 A1* | 2/2018 | Dettori | ................... | G06F 9/505 |
| 2018/0121189 A1* | 5/2018 | Philippov | ................. | G06F 8/65 |
| 2018/0157517 A1* | 6/2018 | Dong | ................... | G06F 9/45558 |
| 2018/0218148 A1* | 8/2018 | D'Errico | ............... | G06F 16/245 |
| 2018/0293117 A1* | 10/2018 | Peng | ..................... | G06F 9/4406 |

OTHER PUBLICATIONS

European Search Report for European Patent Application No. 17161107.2-1954 dated Sep. 18, 2017.

PCT International Search Report and Written Opinion of International Searching Authority dated Jun. 4, 2018 corresponding to PCT International Application No. PCT/EP2018/053898 filed Feb. 16, 2018.

Renner, Thomas, Marius Meldau, and Andreas Kliem. "Towards container-based resource management for the internet of things." 2016 International Conference on Software Networking (ICSN). IEEE, 2016. pp. 1-5.

\* cited by examiner

METHOD FOR OPERATING AN AUTOMATION SYSTEM AND AUTOMATION SYSTEM OPERATING ACCORDING TO THE METHOD

The present patent document is a § 371 nationalization of PCT Application Serial No. PCT/EP2018/053898, filed Feb. 16, 2018, designating the United States, which is hereby incorporated by reference, and this patent document also claims the benefit of European Patent Application No. 17161107.2, filed Mar. 15, 2017, which is also hereby incorporated by reference.

TECHNICAL FIELD

The disclosure relates to a method for operating an automation system and in general a method for operating a fundamentally arbitrary computer system. Furthermore, the disclosure relates to an automation system or rather computer system that functions according to the method and also to a computer program for implementing the method.

BACKGROUND

The so-called container technology is a standard method for combining (packaging) and sharing in a simple manner software applications described below according to the usual language usage in short as applications. This technology is available for diverse operating systems, for example, Windows and Linux. Diverse implementations are available in each case. For example, the Linux system uses the Open-Source-Software "Docker" as the container technology. The so-called "Windows-Container" is available for the Windows operating system.

In order to encapsulate an application in a container, the container includes an entire runtime environment that is required to run the respective application. Accordingly, the container includes, for example, all the binary and configuration files and libraries that are required to run the respective application. The differences in the diverse operating system distributions are extracted by encapsulating applications in a container.

In contrast to operating system virtualization (OS-virtualization), container technology is slimmer and requires fewer resources. In the case of OS-virtualization, the package that is produced includes a virtual machine (VM), the entire operating system as appropriate for virtualization in each case, in particular the respective operating system kernel, and at least one application that is to be run on the virtual machine. In contrast thereto, in the case of container technology all the containers share a common operating system kernel.

Present-day applications (e.g., software applications) frequently require so-called drivers (e.g., driver software) for running the applications. If such applications are to be packaged in one container and shared, this may lead to a problem, because the drivers are integrated as so-called kernel mode software into the respective operating system. However, when using present-day container technologies, it is only possible to extract into a so-called sandbox so-called user mode software, in other words, software on a different, less system-related/system-critical hierarchical level. A container of the above described type represents a so-called sandbox, in that it includes all the data and files required to run the respective application and consequently isolates the application from other applications and the respective operating system (e.g., sandbox).

Because all containers share a common operating system kernel and one container does not have authorization to perform changes in the so-called kernel space, it is not possible at the present time to package kernel mode software in one container. In lieu thereof, disparately costly and resource-intensive traditional OS-virtualization has hitherto been utilized which directly employs the so-called hypervisor. In order to package an application that utilizes kernel mode software, it is necessary for this purpose in addition to the respective application itself for a virtual machine (VM) to be shared inclusively with the entire so-called operating system stack.

This is costly and resource-intensive, for example, if the resulting package together with means for electronic data transmission is distributed to one receiver or multiple receivers.

A kernel version that supports the Docker is disclosed in the article "Towards Container-Based Resource Management for the Internet of Things", 2016 INTERNATIONAL CONFERENCE ON SOFTWARE NETWORKING (ICSN), IEEE by Thomas Renner et al. In this case, the Docker provides resources that are separate from one another. In so doing, Linux namespaces make available isolated containers. In addition, a container virtualization process is performed directly in the kernel.

The creation of multiple kernel zones is disclosed in particular in FIG. 1 in "How to Get Started Creating Oracle Solaris Kernel Zones in Oracle Solaris 11", Duncan Hardie, URL:http://www.oracle.com/technetwork/articles/servers-storage-admin/howto-creat-kernal-zones-s11-2251331.html#6.

SUMMARY AND DESCRIPTION

One object of the disclosure resides accordingly in proposing a possibility to encapsulate an application that requires kernel mode software in a container and to run such an application on a respective target system.

This object is achieved in accordance with the disclosure by a method for operating an automation system, for example, an automation system that is specifically intended for controlling and/or monitoring a technical process and the further description is continued on this basis. The approach proposed here is however fundamentally suitable for computer systems of any type and in this respect an automation system is only an exemplary computer system. Accordingly, each mention below of the term automation system is also to be taken to include general computer systems and computer systems that are not intended or are not primarily intended for automation purposes.

In the case of the approach proposed here, the following is proposed for operating an automation system in which an application that is to be run on the automation system is available in a form that is encapsulated in a container: in the case of kernel mode software that is required by the application that is encapsulated in the container, a computer program that is run on the automation system and described below as a host extender downloads the required kernel mode software from a database that has kernel mode software and installs the required kernel mode software locally on the automation system. In this case, the kernel mode software is installed locally in particular in the form of being integrated into a kernel of an operating system of the automation system.

The decision as to which kernel mode software is required by the respective application and which kernel mode software is accordingly to be downloaded from the database and to be installed locally is made in this case on the basis of metadata that is stored in the container that has the respective application itself. The metadata is in an encrypted format that may be automatically analyzed by the host extender, in other words for example in an XML-format or the like.

In order to avoid unnecessary repetitions, it goes without saying with regard to the further description that features and details that are described in conjunction with the method that is the subject matter of the disclosure and with possible embodiments naturally also apply in conjunction with and with respect to an automation system that is intended for performing the method and conversely with the result that the method may also be developed by individual or multiple method features that relate to method acts that are performed on the automation system, and the automation system may also be developed accordingly by way of performing method acts within the scope of the method. Accordingly, features and details that are described in conjunction with the method that is the subject matter of the disclosure and with possible embodiments naturally also apply in conjunction with and with respect to an automation system that is intended for performing the method and in each case conversely with the result that with regard to the disclosure relating to individual aspects of the disclosure reference is always made or may always be made in a reciprocal manner.

The above-mentioned object is also achieved by an automation system that operates according to the method described here and below and that includes for this purpose for performing the method. In order to achieve the automated performance, the method is realized in the form of a computer program and the disclosure is consequently on the one hand also a computer program that has program code instructions that may be executed by a computer and on the other hand a storage medium that has a computer program of this type, in other words a computer program product that has program code, and also an automation system that has a processing unit in the form of or according to a type of microprocessor and a storage device into which such a computer program is loaded or may be loaded for performing the method and its embodiments.

When method acts or method act sequences are described below, the description relates to actions that are performed on the basis of the computer program or under control of the computer program. In so doing, each use of the term "automated" means that the relevant action is performed based on the computer program or under control of the computer program.

In lieu of a computer program that has individual program code instructions, the method described here and below may also be implemented in the form of firmware. It is clear to the person skilled in the art that in lieu of implementing a method in software, it is always possible to implement a method in firmware or in firmware and software. It is therefore to be understood with regard to the description presented here that the terms software and computer program also include other implementation possibilities, namely in particular an implementation in firmware or in firmware and software.

The advantage of the approach proposed here resides in the fact that the previous container technology is expanded with the result that it is now also possible to encapsulate in one container applications that require kernel mode software. The hitherto advantages, such as simple sharing of applications, rapidly starting containers, efficient use of resources and the like, remain unchanged with the expansion of the container technology.

Advantageous embodiments of the disclosure are subject matter of the subordinate claims. Back references used in this case within the claims refer to the further development of the subject matter of the claim to which reference is being made by the features of the respective dependent claim. They are not to be understood as abandoning the realization of an independent protection of the subject matter of the disclosure for the features or feature combinations of a dependent claim. Furthermore, it is to be assumed with respect to a wording of the claims and also of the description in the case of a more detailed specification of a feature in a dependent claim that a limitation of this type is not provided in the respective preceding claims and a general embodiment of the method that is the subject matter of the disclosure of the automation system that is the subject matter of the automation system. Each reference in the description to aspects of dependent claims is accordingly also to be read without special reference specifically as a description of optional features. Finally, reference is to be made to the fact that the method proposed here may also be developed according to the dependent device claims and conversely.

In the case of one embodiment of the method, in the case of a container having been deleted, the host extender automatically checks whether, in conjunction with running an application that is packaged in the container, the installed kernel mode software is still required. If it is established that the kernel mode software is no longer required, it is automatically deleted by the host extender or caused to be deleted by the host extender. This cleans up not only the kernel and reduces its size. It is also possible to avoid possible incompatibilities by deleting kernel mode software that is no longer required.

In the case of a further embodiment of the method, it is provided that in the case of a plurality of containers the host extender automatically checks compatibility of the respective required kernel mode software. On the basis of such a check, it is possible at least to provide that kernel mode software that is required per se is not installed locally if on the basis of such an installation it is to be expected that there will be incompatibility and accordingly malfunctions or function failures.

In the case of a still further embodiment of the method, it is provided that, in the event of incompatibility being detected on the automation system, the host extender installs a virtual machine, loads into the virtual machine the container that has led to the incompatibility and loads into the kernel of the virtual machine the kernel mode software that is required by the application that is packaged in the container. This renders it possible despite a previously detected incompatibility to run the application that is packaged in the original container, by virtue of the fact that the container and the application are run in a specially generated virtual machine. The fact that the kernel mode software is loaded into the kernel of the virtual machine does not affect the kernel of the operating system of the automation system and accordingly it is also not necessary to address any incompatibility and malfunctions or function failures.

BRIEF DESCRIPTION OF THE DRAWINGS

Exemplary embodiments of the disclosure are further explained below with the aid of the drawings. Mutually corresponding objects or elements are provided with identical reference numerals in all the figures.

DETAILED DESCRIPTION

Figure 1:
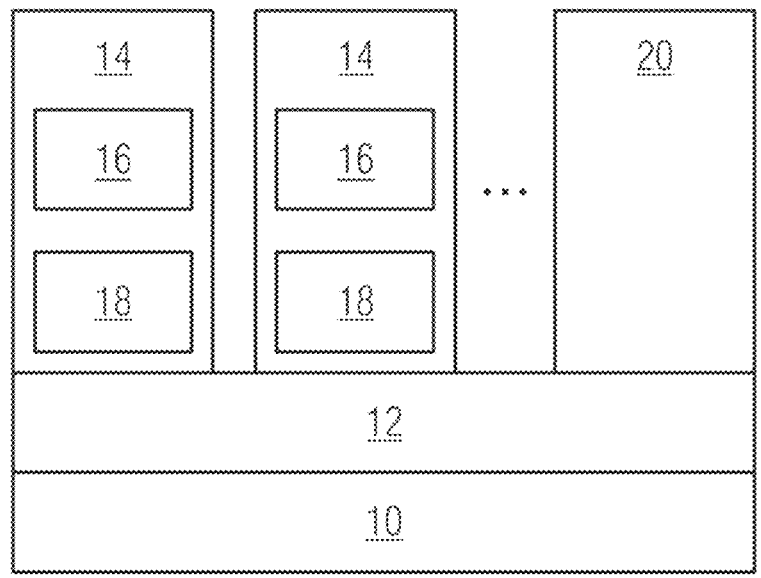
FIG. 1 shows a layer model with an application encapsulated in a container.

The illustration in FIG. 1 illustrates—schematically simplified—in a layer model a device/computer system that is described below as a server 10, in particular a computer system that functions as an automation system for controlling and/or monitoring a fundamentally arbitrary technical process not illustrated here. A respective operating system 12 uses the hardware of the server 10. This is also described below sometimes according to the usual language usage as host OS (host operating system). Individual containers 14 are illustrated above the operating system 12. At least one application 16 and also a runtime environment 18 required for running the respective application 16 are encapsulated in the containers. These are for example binary files and/or libraries. A computer program that is described below as a container manager 20 renders it possible to run an application 16 that is encapsulated in a container 14.

Figure 2:
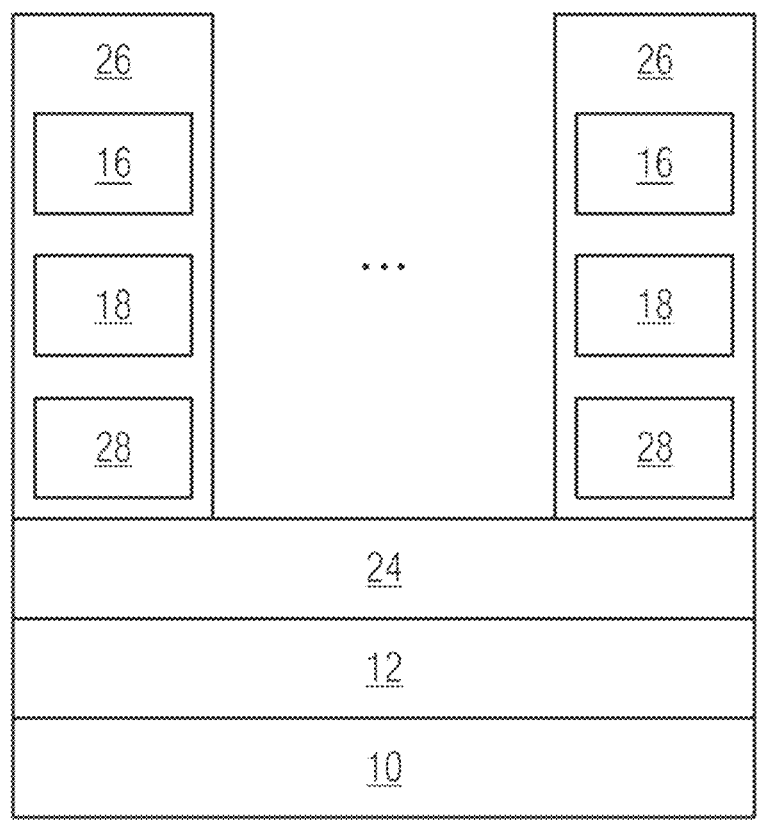
FIG. 2 shows a layer model with an application encapsulated in a virtual machine.

Because it is not possible by the container technology explained in the introduction and illustrated in a schematically simplified manner in FIG. 1 to encapsulate kernel mode software in a container 14, the traditional OS-virtualization system may be used for encapsulating applications 16 that in order to be run require kernel mode software 22 (FIG. 3), for example, a so-called driver, as is illustrated in a schematically simplified manner in the illustration in FIG. 2.

The illustration in FIG. 2 is also based on a layer model and illustrates at the bottom the server hardware 10 of a respective computer target system and above the server hardware the operating system (host OS) 12 that runs on this hardware 10. A so-called hypervisor 24 functions as an interface between the operating system 12 and one or multiple virtual machines (VM) 26. Each virtual machine 26 includes at least one application 16 that is provided for running within and by the virtual machine 26, and the respective guest operating system (guest OS) 28 that is required for running the application 16. The virtual machine 26 also includes a possible runtime environment 18, in particular binary data and/or libraries, which is/are required for running the respective application 16.

Current implementations of the container technology use the container manager 20 (FIG. 1) for managing the respective container 14 and the applications 16 encapsulated therein as central components in the respective local system (e.g., computer target system). The container manager 20 is responsible for the sharing, the installation and the configuration (e.g., deployment) of the containers 14 and also for starting, stopping and deleting the containers.

Figure 3:
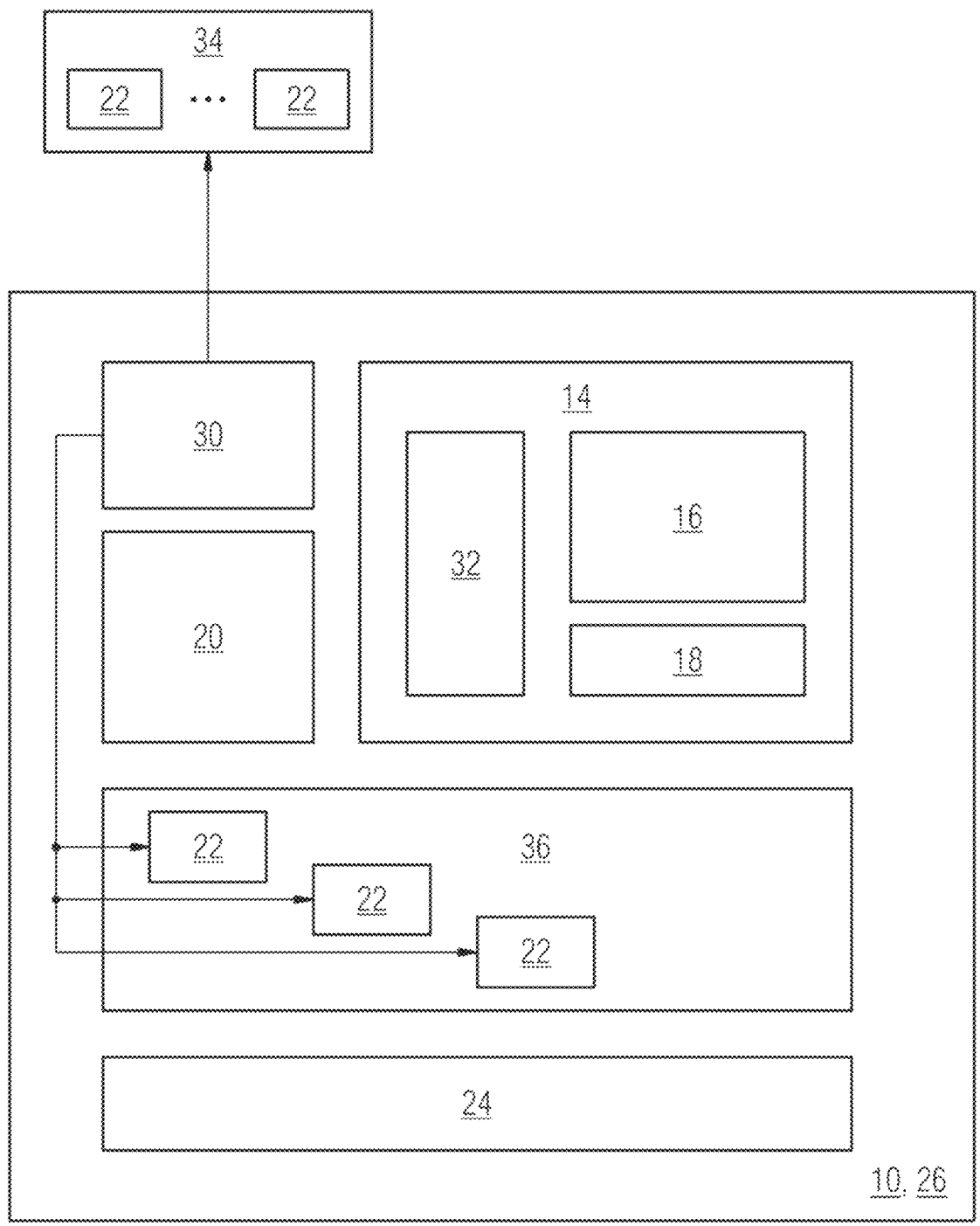
FIG. 3 shows a layer model with an application encapsulated in a container and a computer program for locally installing a kernel mode software that is required by the application.

The approach proposed here is based on an expansion of the container manager 20 by a container manager expansion described below as host extender 30 (FIG. 3). The host extender 30 is responsible for the integration of the kernel mode software 22 into a respective local kernel 36, so that the kernel mode software 22 is available for running the application 16 that is encapsulated by the container 14.

The illustration in FIG. 3 illustrates a container 14 that is intended to be run on a respective target hardware 10 or alternatively to be run in a virtual machine 26. A respective target hardware 10, which is intended to run the container 14, or a virtual machine 26 that is intended to run the container 14 are described as host 10/26, because both the target hardware 10, which is directly suitable for running the container 14, and also a virtual machine 26 that runs on a fundamentally arbitrary target hardware 10 are a possible platform for running the container 14—in other words are a possible "host".

A hypervisor 24 that functions as an interface to the respective target hardware 10 and its operating system 12 or as an interface to the guest operating system 28 of the respective virtual machine 26 is configured on the host 10/26.

The host extender 30 processes metadata 32, which is encapsulated within the container 14 and defines dependencies between on the one hand the or an application 16 that is encapsulated in the container 14 and on the other hand the kernel mode software 22, for example a driver 22 or a plurality of drivers 22. By the metadata 32, it is automatically evident for the container manager 20 as to whether during the start-up of a container 14 specific kernel mode software 22 is available or needs to be installed. In this case, the host extender 30 is responsible for installing on the host 10/26 (e.g., server or VM) the kernel mode software 22 that is required to run an application 16 that is encapsulated in the container 14, in particular the host extender is responsible for integrating the kernel mode software into the kernel 36.

The host extender 30 draws upon the suitable kernel mode software 22 (that is required for running the respective application 16) from a database 34 (e.g., container extension hub) that is available locally or may be accessed for data transmission, in other words for example on the internet. The database 34 includes the kernel mode software 22 that is referenced by a container 14 by the metadata 32 that is stored in the container and is used during runtime.

The host extender 30 plays the central role for managing the kernel mode software 22. When starting up a container 14 on the host 10/26, a check is automatically performed by the host extender 30, for example, as to whether a required driver 22, in other words required kernel mode software 22, is installed in the host 10/26. If the check indicates that the kernel mode software 22 is not yet locally installed in the host 10/26, the host extender 30 causes the kernel mode software to be installed locally, in that the kernel mode software 22 is downloaded from the database 34 and integrated into a kernel 36 of the host 10/26, as is illustrated in the illustration in FIG. 3.

When a further instance of a container 14 that requires the same kernel mode software 22 for running the application 16 that is encapsulated in the container is started up on the host 10/26, the host extender 30 automatically establishes that the required kernel mode software 22 has already integrated into the kernel 36 with the result that the container 14 is started up directly and the application 16 that is encapsulated in the container may be run.

The host extender 30 also manages, for example, in a concatenated list or a comparable data structure 38, which kernel mode software 22 in conjunction with starting up a container 14 has been integrated into the kernel 36. The data structure 38 includes for example for each driver 22 that is integrated into the kernel 36 (kernel mode software 22) a data record 40 (FIG. 4) and this includes in turn a reference to the or each container 14 that requires the respective driver 22. In the case of a container 14 having been deleted, the host extender 30 uses the data structure 38 to automatically check which data record 40 or which data records 40 are referencing this container 14. The reference is deleted in conjunction with deleting the container 14. If in so doing a data record 40 is created that no longer references a container 14—this means that a container 14 no longer exists that requires the driver 22 for which the data record 40 that is managed by the host extender 30 has been originally created—the driver 22 itself may be deleted from the kernel 36. The host extender 30 then causes the respective driver 22 to be uninstalled (removed from the kernel 36).

Figure 4:
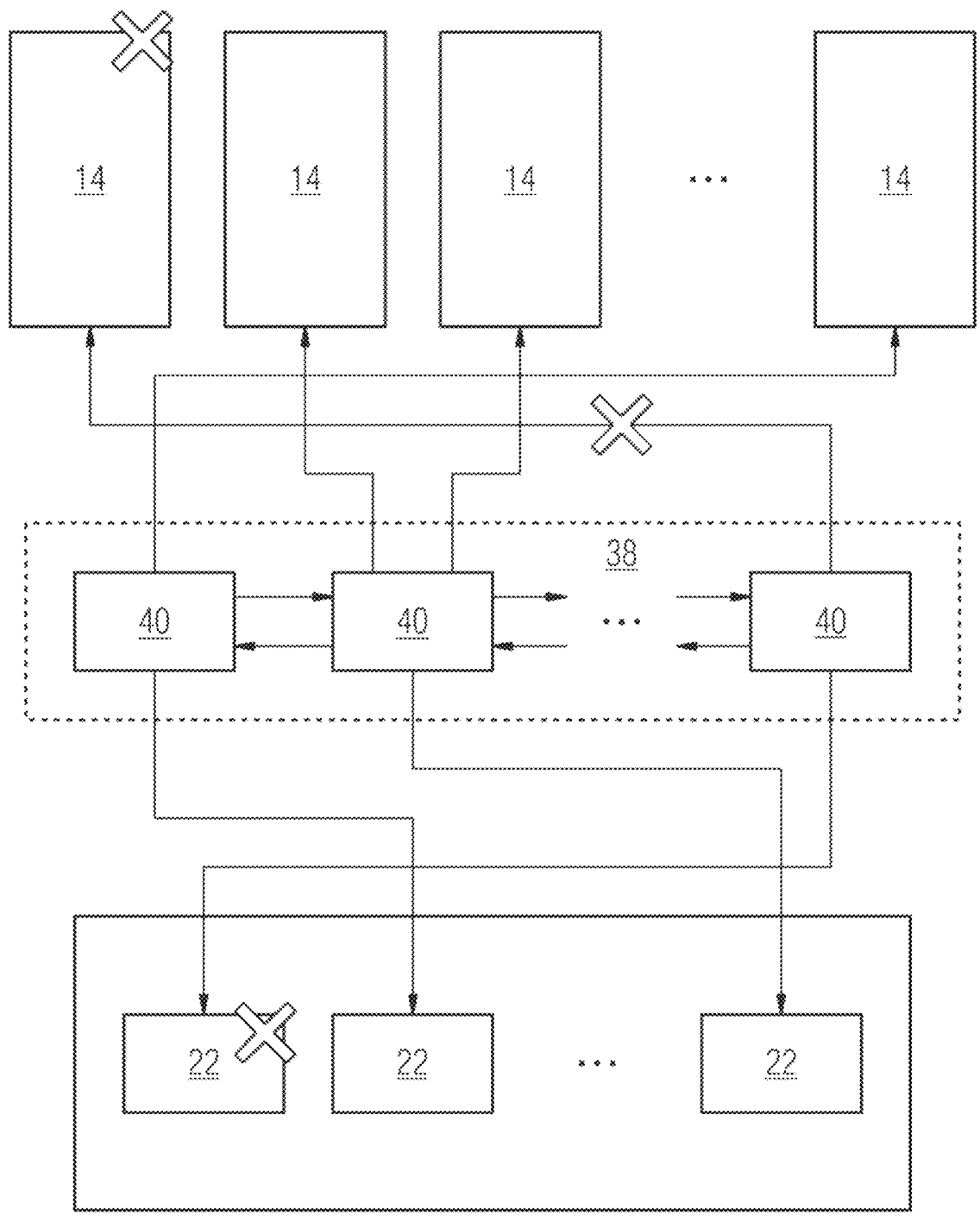
FIG. 4 shows a data structure for deleting locally installed kernel mode software that is no longer required.

The illustration in FIG. 4 illustrates this in a schematically simplified form. In the case of the container 14 that is illustrated on the far left-hand side in the figure having been deleted, the associated data record 40 (namely the data record 40 illustrated on the far right-hand side) is created with the aid of the data structure 38 and with the aid of the data record 40 it is demonstrated which driver 22 this container 14 uses (namely the driver 22 illustrated on the far left-hand side). Because the same driver 22 is not used by another container 14, the driver 22 may likewise be deleted (e.g., uninstalled) in conjunction with deleting the container 14. The described deleting procedures are illustrated in the illustration in FIG. 4 symbolically by individual crosses.

If multiple different containers 14 are started up on the host 10/26, the host extender 30 optionally automatically checks for a compatibility of the dependencies of the container 14 upon the kernel mode software 22, the dependencies being encrypted in the form of metadata 32. If incompatibility is not detected, then the kernel mode software 22 required for operating the container 14 may be installed on the host 10/26 adjacent to one another and the container 14 may be run on the host 10/26.

Figure 5:
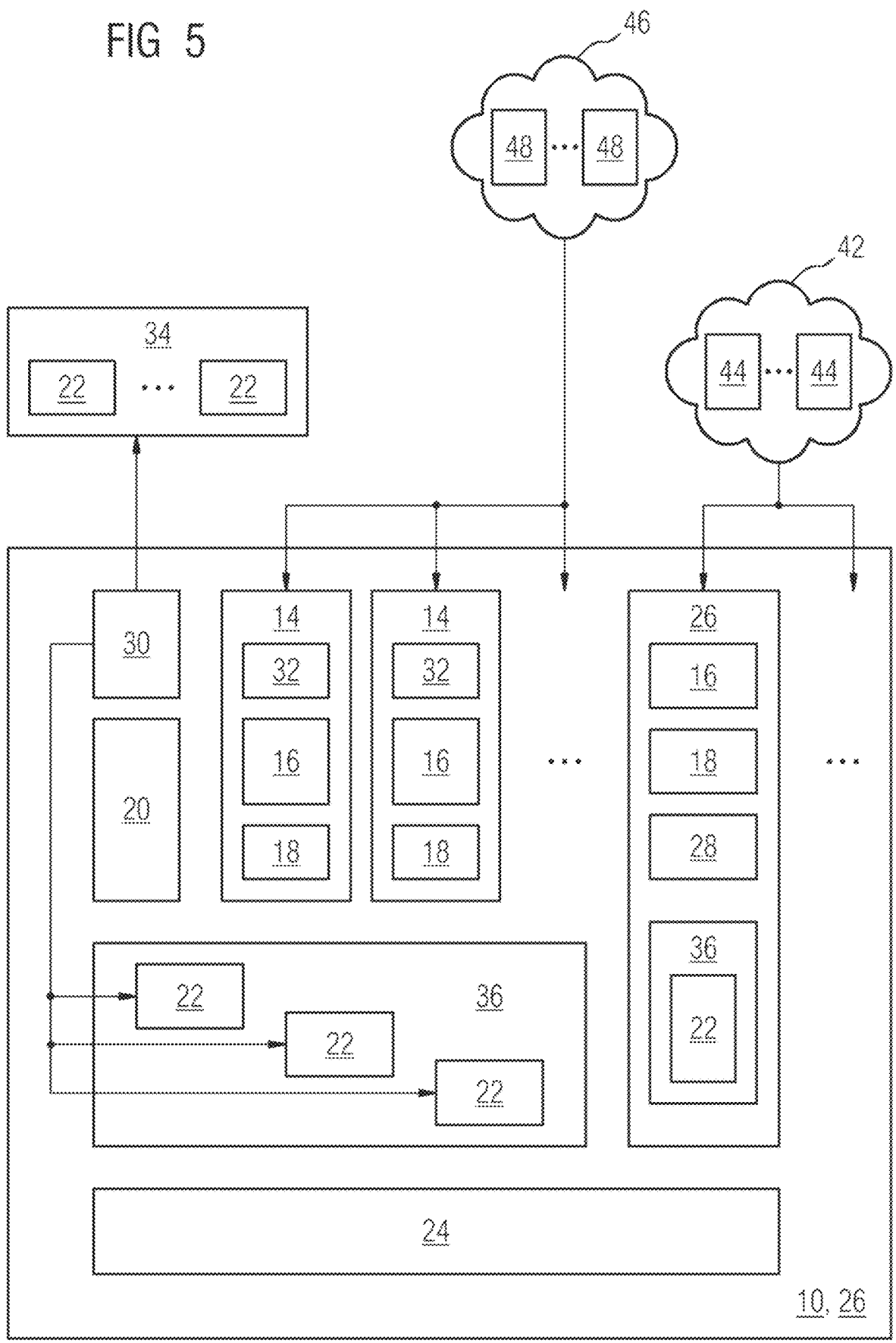
FIG. 5 shows a layer model in accordance with FIG. 3 with a virtual machine that is generated by the computer program so as in the event of compatibility problems to run an application that is encapsulated in the virtual machine.

In the event of incompatibility being detected automatically by the host extender 30, it is provided in the case of a special embodiment proposed here that the host extender 30 automatically and dynamically generates and starts up a virtual machine 26 (FIG. 5) that has container functionality, in which natively (in its kernel 36) the kernel mode software 22 is installed, which had led to the detected incompatibility. Finally, the container 14 which has led to the detected incompatibility is likewise automatically loaded (deployed) by the host extender 30 into this virtual machine 26 and started up. This is illustrated in a schematically simplified manner in the illustration in FIG. 5.

Depending upon the requirement, in the event of an incompatibility being automatically detected, further virtual machines 26 are generated and started up. As long as compatibility exists with the kernel mode software 22 that is loaded into the kernel 36 of the host 10/26, the software is installed directly so as to run further containers 14, in other words without a further encapsulated virtual machine 26.

A virtual machine 26 or further virtual machines are automatically generated by and by the host extender 30 for example on the basis of a further database 42 (e.g., VM hub) in which for example images 44 of different virtual machines 26 are available. A container 14 which is to be run (FIG. 3, FIG. 5) may likewise originate from this database 42 or for example from a dedicated container database 46 which likewise includes in each case an image 48 of a container 14. The database 42 that has images 44 of virtual machines 26 and or the container database 46 that has at least one image 48 of a container 14 may be accessed fundamentally in a manner known per se using a conventional data transmission, in other words, for example, on the internet with the result that an image 44, 48 may be loaded from the respective database 42, 46 and is loaded as required so as to implement the approach that is described here.

Although the disclosure has been further illustrated and described in detail with reference to the exemplary embodiments, the disclosure is not limited by the disclosed example or examples and the person skilled in the art may derive other variations therefrom without abandoning the scope of the disclosure.

Individual aspects that are in the foreground of the description provided here may thus be summarized in short as follows: the proposal relates to a method for operating an automation system and to an automation system that operates according to the method, wherein an application 16 that is to be run on the automation system is available in a form that is encapsulated in a container 14. In accordance with the disclosure proposed here, it is provided in this case that in the case of a kernel mode software 22 that is required by the application 16 that is encapsulated in the container 14, a host extender 30 that is run on the automation system loads the required kernel mode software 22 from a database 34 that has kernel mode software 22 and installs the required kernel mode software locally on the automation system. The decision as to which kernel mode software 22 the respective application 16 requires and which kernel mode software 22 is accordingly to be downloaded from the database 34 and installed locally is made in this case on the basis of metadata 32 that is stored in the container 14 that has the respective application 16 itself.

Further embodiments are described below.

Embodiment 1

Method for operating an automation system, wherein an application 16 that is to be run on the automation system is available in a form that is encapsulated in a container 14 and wherein in the case of a kernel mode software 22 that is required by the application 16 that is encapsulated in the container 14, with the aid of metadata 32 that is stored on the container 14 a host extender 30 that is run on the automation system downloads the required kernel mode software 22 from a database 34 that has kernel mode software 22 and installs the required kernel mode software locally on the automation system.

Embodiment 2

Method according to embodiment 1, wherein the kernel mode software 22 is installed locally in the form of being integrated into a kernel 36 of an operating system 12 of the automation system.

Embodiment 3

Method according to embodiment 1 or 2, wherein, in the case of a container 14 having been deleted, the host extender 30 automatically checks whether, in conjunction with running an application 16 that is packaged in the container 14, the installed kernel mode software 22 is still required and where appropriate deletes the installed kernel mode software.

Embodiment 4

Method according to embodiment 1, 2 or 3, wherein, in the case of a multiplicity of containers 14, the host extender automatically checks the compatibility of the respectively required kernel mode software 22.

Embodiment 5

Method according to embodiment 4, wherein, in the event of incompatibility being detected on the automation system, the host extender 30 installs a virtual machine 26, loads into the virtual machine 26 the container 14 that has led to the incompatibility and loads into the kernel 38 of the virtual machine 26 the kernel mode software 22 that is required by the application 16 that is packaged in the container 14.

Embodiment 6

Computer program 30 having program code in order to perform all the acts of any preceding embodiments if the computer program 30 is executed on an automation system.

Embodiment 7

Automation system having a processing unit and a storage device into which a computer program 30 according to act 6 is loaded, the computer program being executed during the operation of the automation system for the purpose of integrating kernel mode software 22 in a local kernel 36, wherein the kernel mode software 22 is required for running an application 16 that is encapsulated in a container 14.

A further embodiment includes a method for operating an automation system, wherein an application 16 that is to be run on the automation system is available in a form that is encapsulated in a container 14 and, wherein a host extender 30, which may be run on the automation system, in the event of incompatibility being detected on the automation system, installs a virtual machine 26, loads into the virtual machine the container 14 that had led to the incompatibility and loads into the kernel 38 of the virtual machine 26 the kernel mode software 22 that is required by the application 16 that is packaged in the container 14.

This embodiment may be connected in addition to one or multiple embodiments 1 to 4 and 6 to 7.

If for example there is incompatibility between kernel mode software modules, then it is possible to detect this using the host extender. It is possible to define incompatibility explicitly by way of metadata in a container: for example, Driver1 and Driver4 are unable to operate side-by-side. In this case, the host extender reacts accordingly by way of fallback mechanisms. On the one hand, the host extender could uninstall an incompatible driver from the host if the driver is not actually being used by any container instance. If two containers each use drivers that are not compatible with one another, then a virtual machine that has container functionality is dynamically started up into which by way of example natively the corresponding incompatible driver is installed. It is subsequently possible to install the container in this virtual machine and/or to start up the container. The images of the virtual machine may be managed by way of example by way of a virtual machine hub in which images are available.

As a consequence, it is possible to package possible applications that have hitherto not been supported. The hitherto advantages, such as simple sharing of applications, rapidly starting containers, efficient use of resources remain unchanged with the expansion of the container technology.

The described components that assume the management of the kernel mode software module are able by way of corresponding fallback mechanisms to delete any incompatibilities.

In particular, it is possible to integrate kernel mode software into a local kernel 36 on a host that is intended for running the container. It is possible for this purpose to generate a virtual machine for the container.

The invention claimed is:

1. A method for operating an automation system, wherein an application that is to be run on the automation system is available in a form that is encapsulated in a container, the method comprising:

downloading, by a host extender running on the automation system with aid of metadata stored in the container of the automation system, a required kernel mode software from an external database that has kernel mode software, wherein the metadata defines dependencies between the application to be run and the kernel mode software, and wherein the host extender running on the automation system automatically analyzes the metadata stored in the container of the automation system to determine the required kernel mode software to download from the external database;

installing, by the host extender, the kernel mode software locally on the automation system;

installing, by the host extender, a virtual machine when an incompatibility is detected on the automation system;

loading, into the virtual machine, the container that has led to the incompatibility; and loading, into a kernel of the virtual machine, the kernel mode software required by the application encapsulated in the container.

2. The method of claim 1, wherein the kernel mode software is installed locally in a form of being integrated into a kernel of an operating system of the automation system.

3. The method of claim 2, wherein, when the container has been deleted, the host extender automatically checks whether, in conjunction with running the application that is encapsulated in the container, the installed kernel mode software is still required, and deletes the installed kernel mode software when the installed kernel mode software is not required.

4. The method of claim 3, wherein, in a case of a plurality of containers, the host extender automatically checks a compatibility of the respectively required kernel mode software for each container of the plurality of containers.

5. The method of claim 1, wherein, when the container has been deleted, the host extender automatically checks whether, in conjunction with running the application that is encapsulated in the container, the installed kernel mode software is still required, and deletes the installed kernel mode software when the installed kernel mode software is not required.

6. The method of claim 5, wherein, in a case of a plurality of containers, the host extender automatically checks a compatibility of the respectively required kernel mode software for each container of the plurality of containers.

7. The method of claim 1, wherein, in a case of a plurality of containers, the host extender automatically checks a compatibility of the respectively required kernel mode software for each container of the plurality of containers.

8. The method of claim 1, wherein the metadata is in an encrypted format.

9. The method of claim 1, wherein the metadata is in an XML-format.

10. A computer program having program code, wherein, when the computer program is executed on an automation system, the computer program is configured to:

download, with aid of metadata stored in a container of the automation system, a required kernel mode software from an external database that has kernel mode software, wherein the metadata defines dependencies between an application to be run and the kernel mode software, and wherein the metadata stored in the container is analyzed by the automation system to determine the required kernel mode software to download from the external database;

install the kernel mode software locally on the automation system;

install a virtual machine when an incompatibility is detected on the automation system;

load, into the virtual machine, the container that has led to the incompatibility; and load, into a kernel of the virtual machine, the kernel mode software required by the application encapsulated in the container.

11. An automation system comprising:
a container;
a processor; and
a storage device having a computer program loaded therein, wherein the computer program is configured to, when executed by the processor during operation of the automation system, to:

download, with aid of metadata stored in the container of the automation system, a required kernel mode software from an external database that has kernel mode software, wherein the metadata defines dependencies between an application to be run and the kernel mode software, and wherein the metadata stored in the container is analyzed by the automation system to determine the required kernel mode software to download from the external database;

install the kernel mode software locally on the automation system;

install a virtual machine when an incompatibility is detected on the automation system;

load, into the virtual machine, the container that has led to the incompatibility; and load, into a kernel of the virtual machine, the kernel mode software required by the application encapsulated in the container.

\* \* \* \* \*